(12) United States Patent
Komamine et al.

(10) Patent No.: US 11,644,329 B2
(45) Date of Patent: May 9, 2023

(54) INFORMATION PROCESSING APPARATUS, NON-TRANSITORY COMPUTER READABLE MEDIUM, AND INFORMATION PROCESSING METHOD

(71) Applicant: TOYOTA JIDOSHA KABUSHIKI KAISHA, Aichi-ken (JP)

(72) Inventors: Satoshi Komamine, Nagoya (JP); Toyokazu Nakashima, Nagoya (JP); Koichi Suzuki, Miyoshi (JP); Lei Wang, Toyota (JP); Jun Karashima, Toyota (JP); Kenichi Yamada, Nisshin (JP); Hiromitsu Fujii, Kariya (JP); Shota Minami, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/658,253

(22) Filed: Apr. 6, 2022

(65) Prior Publication Data
US 2022/0326029 A1 Oct. 13, 2022

(30) Foreign Application Priority Data
Apr. 7, 2021 (JP) .............................. JP2021-065506

(51) Int. Cl.
*G01C 21/36* (2006.01)
*G06Q 30/0207* (2023.01)
*G01C 21/34* (2006.01)

(52) U.S. Cl.
CPC ..... *G01C 21/3605* (2013.01); *G01C 21/3476* (2013.01); *G06Q 30/0212* (2013.01)

(58) Field of Classification Search
CPC ............ G01C 21/3605; G01C 21/3476; G06Q 30/0212
See application file for complete search history.

(56) References Cited

U.S. PATENT DOCUMENTS

| 10,346,784 B1* | 7/2019 | Powell ............... G06Q 10/0639 |
| 10,346,889 B1* | 7/2019 | Reiss ................. G06Q 10/0833 |
| 11,214,437 B1* | 1/2022 | Ebrahimi Afrouzi ...................... G05D 1/0212 |
| 2014/0149269 A1* | 5/2014 | Kantarjiev ............. G06Q 50/28 705/330 |
| 2016/0300184 A1* | 10/2016 | Zamer ................ G06Q 10/0836 |
| 2018/0260883 A1* | 9/2018 | Iacono ............... G06Q 30/0641 |
| 2019/0130260 A1* | 5/2019 | Han .................... G06Q 10/0838 |
| 2022/0012677 A1* | 1/2022 | Rongley ............ G06K 7/10297 |

FOREIGN PATENT DOCUMENTS

JP        2001351170 A    12/2001

* cited by examiner

*Primary Examiner* — Joseph J Dallo
(74) *Attorney, Agent, or Firm* — Hauptman Ham, LLP

(57) ABSTRACT

An information processing apparatus includes a controller configured to acquire schedule information, upon acquiring information regarding a need to transport a product of a first shop to a second shop, for at least one user who is staying near the first shop or is scheduled to pass near the first shop, select, based on the schedule information, a user for requesting transportation of the product from among the at least one user, and transmit, to a terminal apparatus of the selected user, information requesting transportation of the product.

20 Claims, 5 Drawing Sheets

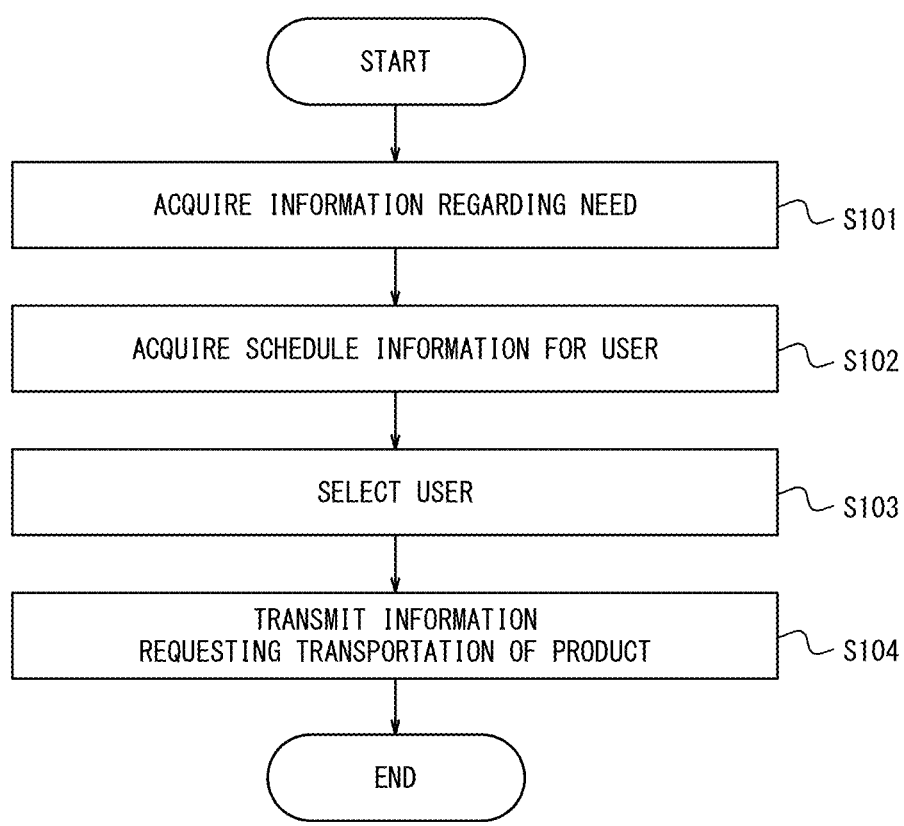

INFORMATION PROCESSING APPARATUS, NON-TRANSITORY COMPUTER READABLE MEDIUM, AND INFORMATION PROCESSING METHOD

CROSS-REFERENCE TO RELATED APPLICATION

This application claims priority to Japanese Patent Application No. 2021-065506 filed on Apr. 7, 2021, the entire contents of which are incorporated herein by reference.

TECHNICAL FIELD

The present disclosure relates to an information processing apparatus, a program, and an information processing method.

BACKGROUND

Carriers are typically requested to transport products, but transportation of products by a carrier takes at least one day.

For example, Patent Literature (PTL) 1 discloses a delivery service system in which a taxi is requested to transport products instead of a carrier.

CITATION LIST

Patent Literature

PTL 1: JP 2001-351170 A

SUMMARY

Requesting that a taxi transport products as in the system described in PTL 1 enables transportation of products in a short time. There are certain restrictions, however, when requesting that a taxi transport products. For example, requesting that a taxi transport products over long distances is impractical from a cost perspective.

It would be helpful to improve the convenience of requesting transportation of products by a party other than a carrier.

An information processing apparatus according to the present disclosure includes a controller configured to:

acquire schedule information, upon acquiring information regarding a need to transport a product of a first shop to a second shop, for at least one user who is staying near the first shop or is scheduled to pass near the first shop;

select, based on the schedule information, a user for requesting transportation of the product from among the at least one user; and transmit, to a terminal apparatus of the selected user, information requesting transportation of the product.

A program according to the present disclosure is configured to cause a computer to perform operations including:

acquiring schedule information, upon acquiring information regarding a need to transport a product of a first shop to a second shop, for at least one user who is staying near the first shop or is scheduled to pass near the first shop;

selecting, based on the schedule information, a user for requesting transportation of the product from among the at least one user; and transmitting, to a terminal apparatus of the selected user, information requesting transportation of the product.

An information processing method according to the present disclosure is an information processing method in an information processing apparatus and includes:

acquiring schedule information, upon acquiring information regarding a need to transport a product of a first shop to a second shop, for at least one user who is staying near the first shop or is scheduled to pass near the first shop;

selecting, based on the schedule information, a user for requesting transportation of the product from among the at least one user; and transmitting, to a terminal apparatus of the selected user, information requesting transportation of the product.

According to the present disclosure, the convenience of requesting transportation of products by a party other than a carrier can be improved.

BRIEF DESCRIPTION OF THE DRAWINGS

In the accompanying drawings:

FIG. 5 is a flowchart illustrating operations of an information processing system according to an embodiment of the present disclosure.

DETAILED DESCRIPTION

An embodiment of the present disclosure is described below with reference to the drawings.

Figure 1:
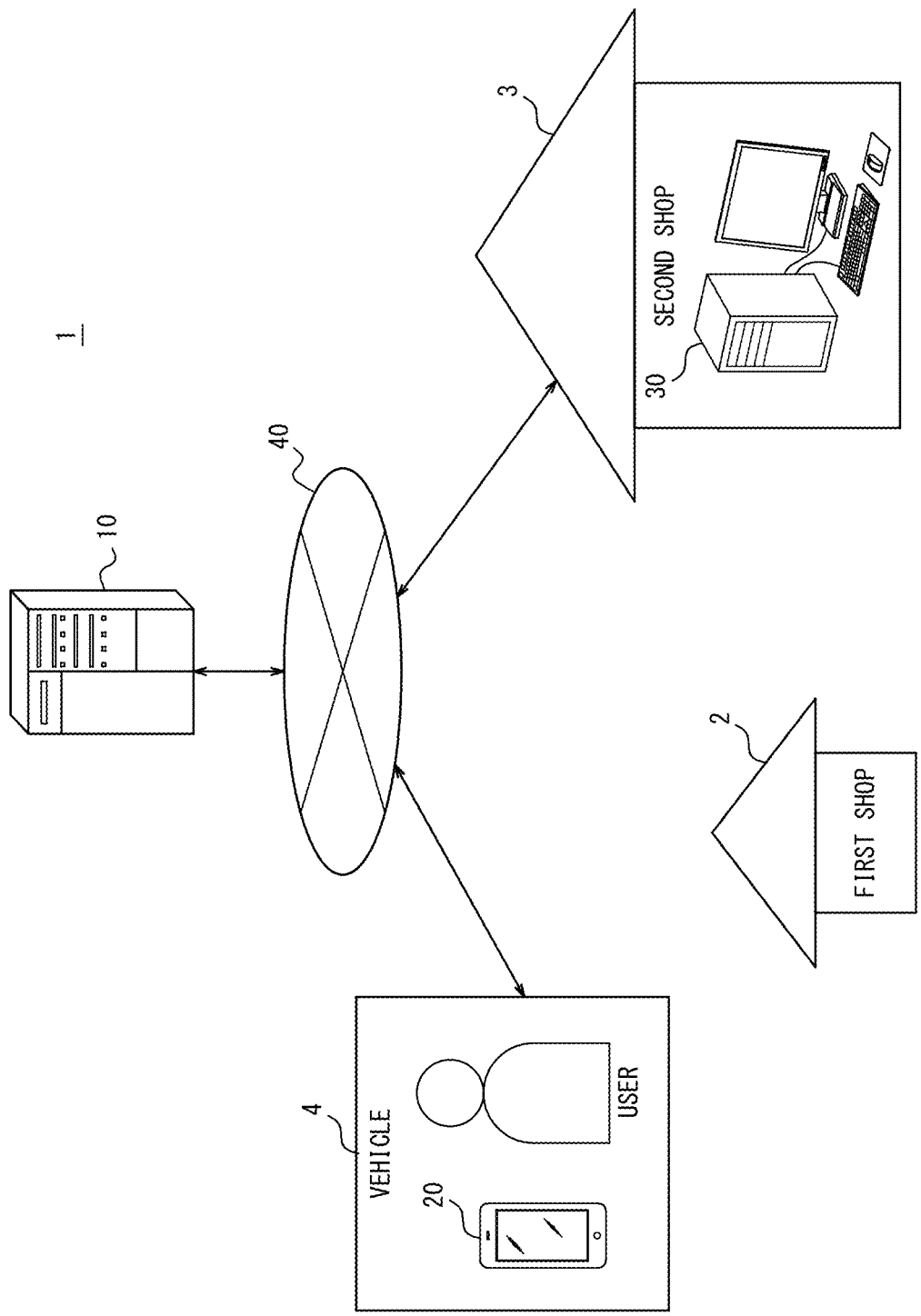
FIG. 1 is a diagram illustrating a configuration of an information processing system according to an embodiment of the present disclosure.

FIG. 1 is a diagram illustrating a configuration of an information processing system 1 according to an embodiment of the present disclosure. The configuration and outline of the information processing system 1 according to an embodiment of the present disclosure are described with reference to FIG. 1.

The information processing system 1 includes an information processing apparatus 10, a first terminal apparatus 20, and a second terminal apparatus 30. The information processing apparatus 10, the first terminal apparatus 20, and the second terminal apparatus 30 are communicably connected via a network 40. The network 40 may be a network including a mobile communication network, the Internet, and the like.

In FIG. 1, one each of the information processing apparatus 10, the first terminal apparatus 20, and the second terminal apparatus 30 are illustrated, but the number of information processing apparatuses 10, first terminal apparatuses 20, and second terminal apparatuses 30 may be two or more of each.

The first terminal apparatus 20 is a terminal apparatus owned by a user who plans to travel on board a vehicle 4. In FIG. 1, the user is depicted on board the vehicle 4, but the user does not need to be on board the vehicle 4. The first terminal apparatus 20 corresponds to the "terminal apparatus" recited in the claims.

The user is not a carrier or the like, but an ordinary person who travels on board the vehicle 4. The user may, for example, be a traveler who travels on board the vehicle 4.

The user is a person who can transport a product when a request for the transportation of a product is received. The user can load the requested product onto the vehicle 4 for transportation of the product. The user has registered in advance, with the information processing apparatus 10, that the user can transport products.

The user receives, with the first terminal apparatus 20, the request for transportation of a product. In a case in which the user is able to transport the product in response to the request received by the first terminal apparatus 20, the user operates the first terminal apparatus 20 to transmit, to the information processing apparatus 10, information indicating that the product can be transported. Subsequently, the user transports the product based on the request received by the first terminal apparatus 20.

The vehicle 4 may, for example, be a private car of the user. The vehicle 4 may be any type of automobile, such as a gasoline-powered vehicle, a diesel-powered vehicle, an HEV (Hybrid Electric Vehicle), a PHEV (Plug-in Hybrid Electric Vehicle), a BEV (Battery Electric Vehicle), a FCEV (Fuel Cell Electric Vehicle), or the like. Driving of the vehicle 4 may be automated at any level. The automation level is, for example, any one of Level 1 to Level 5 according to the level classification defined by the Society of Automotive Engineers (SAE).

A first shop 2 is a shop that sells certain products. The products sold by the first shop 2 may be any type of products. The first shop 2 may, for example, be a shop located in a rural area. The first shop 2 may, for example, sell products that are specialties of the region in which the first shop 2 is located.

A second shop 3 is a shop that sells certain products. The products sold by the second shop 3 may be any type of products. The second shop 3 may, for example, be a shop located in an urban area. The second shop 3 is, for example, a shop that plans to sell the specialty products sold by the first shop 2 as products of the second shop 3.

The second terminal apparatus 30 is a terminal apparatus installed in the second shop 3, or a terminal apparatus owned by an employee of the second shop 3. The second terminal apparatus 30 is, for example, operated by an employee of the second shop 3.

When the employee of the second shop 3 wants to obtain a product of the first shop 2, the employee operates the second terminal apparatus 30 to transmit, to the information processing apparatus 10, information regarding a need to transport a product of the first shop 2 to the second shop 3.

Upon acquiring, from the second terminal apparatus 30, information regarding a need to transport a product of the first shop 2 to the second shop 3, the information processing apparatus 10 acquires schedule information for at least one user who is staying near the first shop 2 or is scheduled to pass near the first shop 2. Based on the acquired schedule information, the information processing apparatus 10 selects a user, from among the at least one user, for requesting transportation of the product from the first shop 2 to the second shop 3. The information processing apparatus 10 transmits information, requesting transportation of the product, to the first terminal apparatus 20 of the user selected as the user for requesting transportation of the product from the first shop 2 to the second shop 3.

The information processing apparatus 10 can communicate with the first terminal apparatus 20 and the second terminal apparatus 30 via the network 40. The information processing apparatus 10 is, for example, a dedicated computer configured to function as a server. The information processing apparatus 10 may be a general purpose personal computer (PC).

The first terminal apparatus 20 can communicate with the information processing apparatus 10 via the network 40. The first terminal apparatus 20 is a terminal apparatus owned by a user who plans to travel on board the vehicle 4. The first terminal apparatus 20 may, for example, be a smartphone or tablet.

The second terminal apparatus 30 can communicate with the information processing apparatus 10 via the network 40. The second terminal apparatus 30 is a terminal apparatus installed in the second shop 3, or a terminal apparatus owned by an employee of the second shop 3. The second terminal apparatus 30 may, for example, be a general purpose PC, a smartphone, or a tablet.

Figure 2:
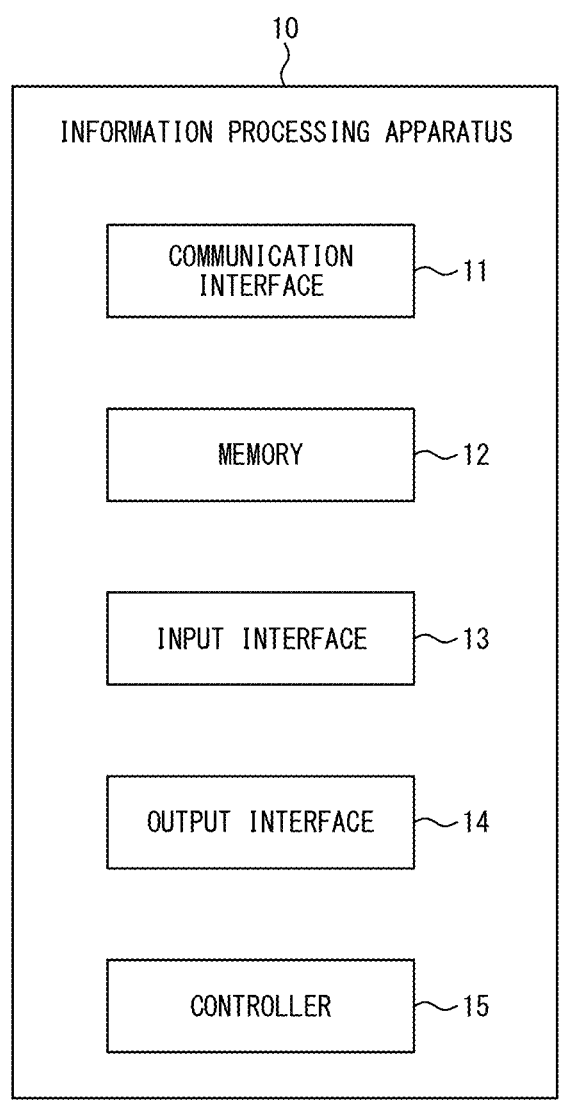
FIG. 2 is a block diagram illustrating a configuration of an information processing apparatus according to an embodiment of the present disclosure.

A configuration of the information processing apparatus 10 according to an embodiment of the present disclosure is described with reference to FIG. 2.

The information processing apparatus 10 includes a communication interface 11, a memory 12, an input interface 13, an output interface 14, and a controller 15.

The communication interface 11 includes a communication module that connects to the network 40. For example, the communication interface 11 may include a communication module corresponding to a local area network (LAN). In an embodiment, the information processing apparatus 10 is connected to the network 40 via the communication interface 11. The communication interface 11 transmits and receives various information via the network 40. The communication interface 11 can communicate with the first terminal apparatus 20 and the second terminal apparatus 30 via the network 40.

The memory 12 is, for example, a semi-conductor memory, a magnetic memory, an optical memory, or the like, but is not limited to these. The memory 12 may function as, for example, a main memory, an auxiliary memory, or a cache memory. The memory 12 stores any information used for operations of the information processing apparatus 10. For example, the memory 12 may store a system program, an application program, various types of information received by the communication interface 11, and the like. The information stored in the memory 12 may be updated with information received from the network 40 via the communication interface 11, for example. A portion of the memory 12 may be installed externally to the information processing apparatus 10. In this case, the externally installed portion of the memory 12 may be connected to the information processing apparatus 10 via any appropriate interface.

The input interface 13 includes one or more input interfaces for detecting user input and acquiring input information based on user operation. For example, the input interface 13 includes, but is not limited to, a physical key, a capacitive key, a touch screen integrally provided with a display of the output interface 14, or a microphone that receives audio input.

The output interface 14 includes one or more output interfaces for outputting information to notify the user. For example, the output interface 14 includes, but is not limited to, a display for outputting information as images, a speaker for outputting information as audio, or the like.

The controller 15 includes at least one processor, at least one dedicated circuit, or a combination thereof. The processor is a general purpose processor, such as a central processing unit (CPU) or a graphics processing unit (GPU), or a dedicated processor specialized for particular processing. The dedicated circuit is, for example, a field-programmable gate array (FPGA) or an application specific integrated circuit (ASIC). The controller 15 executes processes related to operations of the information processing apparatus 10 while controlling components of the information processing apparatus 10.

Figure 3:
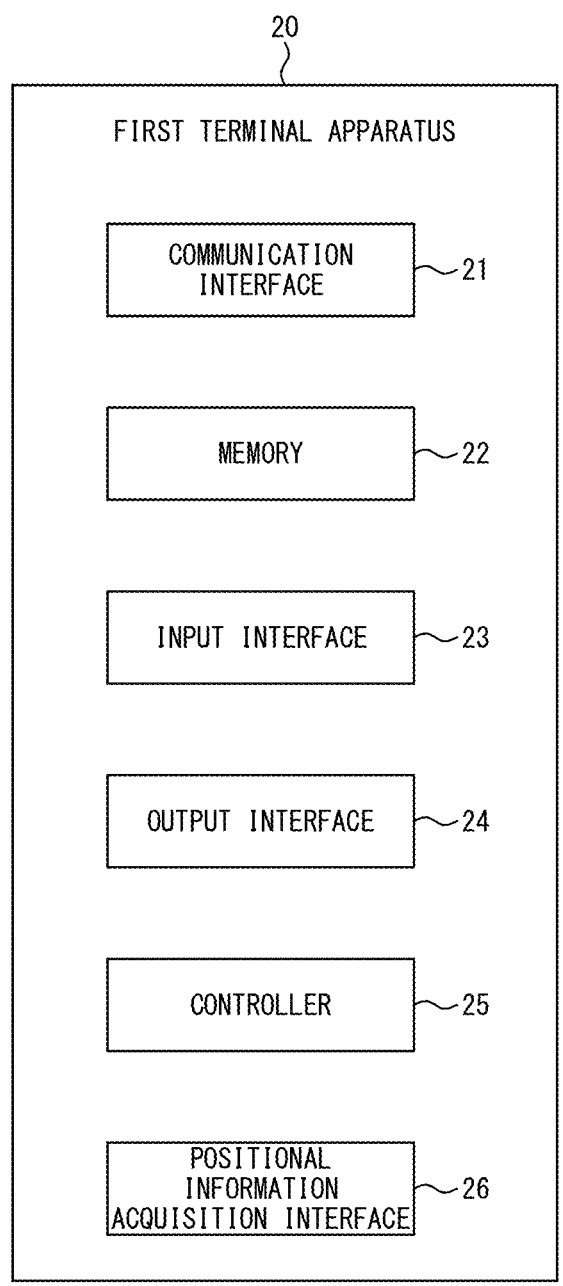
FIG. 3 is a block diagram illustrating a configuration of a first terminal apparatus according to an embodiment of the present disclosure.

A configuration of the first terminal apparatus 20 according to an embodiment of the present disclosure is described with reference to FIG. 3.

The first terminal apparatus 20 includes a communication interface 21, a memory 22, an input interface 23, an output interface 24, a controller 25, and a positional information acquisition interface 26.

The communication interface 21 includes a communication module that connects to the network 40. For example, the communication interface 21 may include a communication module compliant with mobile communication standards such as Long Term Evolution (LTE), 4th Generation (4G), and 5th Generation (5G). In an embodiment, the first terminal apparatus 20 is connected to the network 40 via the communication interface 21. The communication interface 21 transmits and receives various information via the network 40. The communication interface 21 can communicate with the information processing apparatus 10 via the network 40.

The memory 22 is, for example, a semi-conductor memory, a magnetic memory, an optical memory, or the like, but is not limited to these. The memory 22 may function as, for example, a main memory, an auxiliary memory, or a cache memory. The memory 22 stores any information used for operations of the first terminal apparatus 20. For example, the memory 22 may store a system program, an application program, various types of information received by the communication interface 21, and the like. The information stored in the memory 22 may be updated with information received from the network 40 via the communication interface 21, for example. A portion of the memory 22 may be installed externally to the first terminal apparatus 20. In this case, the externally installed portion of the memory 22 may be connected to the first terminal apparatus 20 via any appropriate interface.

The input interface 23 includes one or more input interfaces for detecting user input and acquiring input information based on user operation. The input interface 23 is, for example, a physical key, a capacitive key, a touch screen integrally provided with a display of the output interface 24, a microphone for receiving audio input, or the like, but is not limited to these.

The output interface 24 includes one or more output interfaces for outputting information to notify the user. For example, the output interface 24 includes, but is not limited to, a display for outputting information as images or a speaker for outputting information as audio.

The controller 25 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 25 executes processes related to operations of the first terminal apparatus 20 while controlling the components of the first terminal apparatus 20.

The positional information acquisition interface 26 includes at least one receiver compliant with a satellite positioning system. For example, the positional information acquisition interface 26 may include a Global Positioning System (GPS) receiver. The positional information acquisition interface 26 acquires a measured value of the position of the first terminal apparatus 20 as positional information. The positional information includes, for example, an address, a latitude, a longitude, an altitude, and the like.

Figure 4:
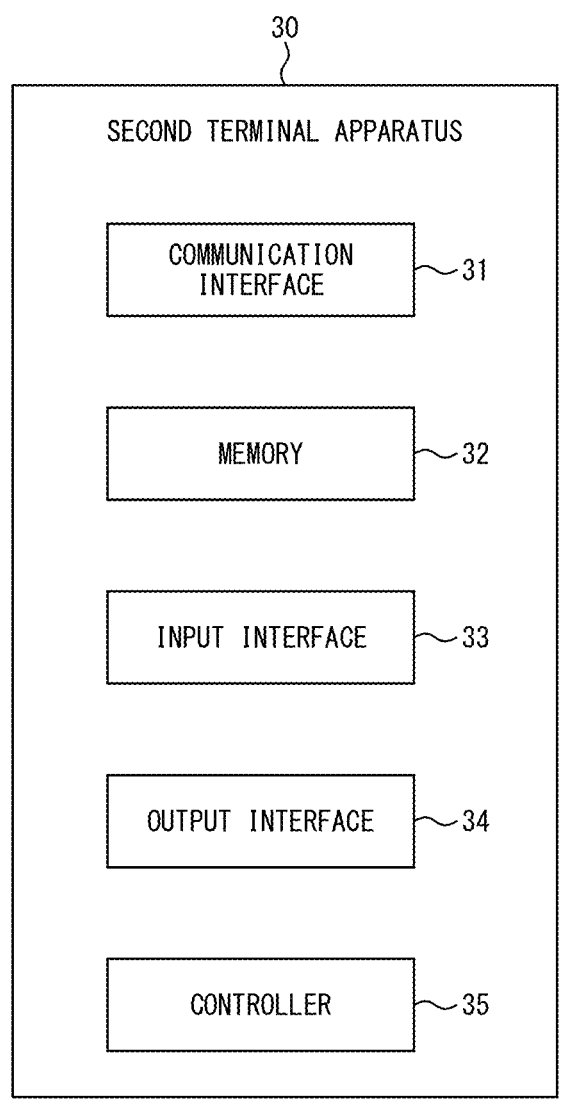
FIG. 4 is a block diagram illustrating a configuration of a second terminal apparatus according to an embodiment of the present disclosure.

A configuration of the second terminal apparatus 30 according to an embodiment of the present disclosure is described with reference to FIG. 4.

The second terminal apparatus 30 includes a communication interface 31, a memory 32, an input interface 33, an output interface 34, and a controller 35.

The communication interface 31 includes a communication module that connects to the network 40. For example, the communication interface 31 may include a communication module corresponding to a LAN. In an embodiment, the second terminal apparatus 30 is connected to the network 40 via the communication interface 31. The communication interface 31 transmits and receives various information via the network 40. The communication interface 31 can communicate with the information processing apparatus 10 via the network 40.

The memory 32 is, for example, a semi-conductor memory, a magnetic memory, an optical memory, or the like, but is not limited to these. The memory 32 may function as, for example, a main memory, an auxiliary memory, or a cache memory. The memory 32 stores any information used for operations of the second terminal apparatus 30. For example, the memory 32 may store a system program, an application program, various types of information received by the communication interface 31, and the like. The information stored in the memory 32 may be updated with information received from the network 40 via the communication interface 31, for example. A portion of the memory 32 may be installed externally to the second terminal apparatus 30. In this case, the externally installed portion of the memory 32 may be connected to the second terminal apparatus 30 via any appropriate interface.

The input interface 33 includes one or more input interfaces for detecting user input and acquiring input information based on user operation. The input interface 33 is, for example, a physical key, a capacitive key, a touch screen integrally provided with a display of the output interface 34, a microphone for receiving audio input, or the like, but is not limited to these.

The output interface 34 includes one or more output interfaces for outputting information to notify the user. For example, the output interface 34 includes, but is not limited to, a display for outputting information as images, a speaker for outputting information as audio, or the like.

The controller 35 includes at least one processor, at least one dedicated circuit, or a combination thereof. The processor is a general purpose processor such as a CPU or a GPU, or a dedicated processor that is dedicated to specific processing. The dedicated circuit is, for example, an FPGA or an ASIC. The controller 35 executes processes related to operations of the second terminal apparatus 30 while controlling the components of the second terminal apparatus 30.

(Operations of Information Processing System)

Operations of the information processing system 1 illustrated in FIG. 1 are described with reference to FIGS. 1 to 4.

A user who can transport products when receiving a request for transportation of the products has registered in advance, with the information processing apparatus 10, that the user can transport products.

When the user registers in advance, with the information processing apparatus 10, that the user can transport products, the user inputs information to the input interface 23 of the first terminal apparatus 20 indicating that the user can transport products. The controller 25 transmits the information, indicating that the user can transport products, to the information processing apparatus 10 via the communication interface 21.

The communication interface 11 of the information processing apparatus 10 receives the information, transmitted by the first terminal apparatus 20, indicating that products can be transported. Via the communication interface 11, the controller 15 acquires the information, transmitted by the first terminal apparatus 20, indicating that products can be transported. The controller 15 stores information in the memory 12 on the user who, with the first terminal apparatus 20, transmitted the information indicating that products can be transported.

The first terminal apparatus 20, of the user who registered with the information processing apparatus 10 that the user can transport products, periodically transmits positional information for the first terminal apparatus 20, acquired by the positional information acquisition interface 26, to the information processing apparatus 10 via the communication interface 21.

The communication interface 11 of the information processing apparatus 10 receives the positional information for the first terminal apparatus 20 transmitted by the first terminal apparatus 20. The controller 15 acquires, via the communication interface 11, the positional information for the first terminal apparatus 20 transmitted by the first terminal apparatus 20. The controller 15 stores, in the memory 12, the positional information for the first terminal apparatus 20 of the user that can transport products.

The information processing apparatus 10 can acquire schedule information for a user who can transport products. For example, the controller 15 of the information processing apparatus 10 may acquire schedule information for the user from a server that stores data for a schedule management application used by the user.

Any number, one or more, of users may be registered with the information processing apparatus 10 as being able to transport products. In the case of a plurality of users, the memory 12 of the information processing apparatus 10 stores information on each of the users. The memory 12 stores the positional information for the first terminal apparatus 20 of each user.

An employee of the second shop 3 inputs, to the input interface 33 of the second terminal apparatus 30, information regarding a need to transport a product of the first shop 2 to the second shop 3 in a case in which, for example, the employee wishes to sell a product sold at the first shop 2, which is located far away, at the second shop 3. The product sold at the first shop 2 may, for example, be a specialty product sold only in the region where the first shop 2 is located.

The information regarding a need requesting that the product of the first shop 2 be transported to the second shop 3 may include information such as information on the first shop 2, information on the second shop 3, the type of product, the quantity of the product, the desired arrival time of the product at the second shop 3, and an incentive to be awarded to the user in a case in which the product is transported. The "information regarding a need requesting that the product of the first shop 2 be transported to the second shop 3" may be referred to below simply as "information regarding the need".

The controller 35 transmits, to the information processing apparatus 10 via the communication interface 31, the information regarding the need, for which the input interface 33 accepted input, for the product of the first shop 2 to be transported to the second shop 3.

The communication interface 11 of the information processing apparatus 10 receives the information regarding the need transmitted by the second terminal apparatus 30. The controller 15 acquires the information regarding the need via the communication interface 11.

When acquiring the information regarding the need, the controller 15 acquires schedule information for a user who is staying near the first shop 2 or is scheduled to pass near the first shop 2. The controller 15 may acquire schedule information for at least one user who is staying near the first shop 2 or is scheduled to pass near the first shop 2.

The controller 15 may refer to the positional information, stored in the memory 12, for the first terminal apparatus 20 of a plurality of users to extract the user who is staying near the first shop 2 and acquire the schedule information for the extracted user.

The controller 15 may, for example, extract a user who is scheduled to pass near the first shop 2 based on the schedule information for a plurality of users that has been acquired in advance, and acquire the schedule information for the extracted user.

Here, "near the first shop 2" means within a predetermined distance from the first shop 2. The predetermined distance may be a value set in advance. The expression "staying near the first shop 2" includes the case of staying at the first shop 2. The expression "scheduled to pass near the first shop 2" includes the case of being scheduled to pass through the first shop 2.

Based on the acquired schedule information for the plurality of users, the controller 15 selects a user for requesting transportation of the product of the first shop 2 to the second shop 3.

The schedule information acquired by the controller 15 includes schedule information after the user passes near the first shop. The controller 15 may select a user for requesting transportation of the product of the first shop 2 to the second shop 3 based on the schedule information after passing near the first shop. The expression "schedule information after passing near the first shop 2" includes the meaning of the schedule information after departing from the first shop 2. The expression "schedule information after passing near the first shop 2" may include the meaning of the schedule information after arriving at the first shop 2.

Based on the acquired schedule information, the controller 15 estimates the time when the user passes near the first shop 2, the destination after the user passes near the first shop 2, and/or the route after the user passes near the first shop 2.

Based on any or a combination of this estimated information, the controller 15 may select a user for requesting transportation of the product of the first shop 2 to the second shop 3.

The controller 15 estimates, for example, the time at which the user can arrive at the second shop 3 based on the time at which the user passes near the first shop 2, which is estimated based on the schedule information. Based on the estimated time at which the user can arrive at the second shop 3, the controller 15 may select a user who is estimated to be able to arrive at the second shop 3 by the desired arrival time of the product to the second shop 3, which is included in the information regarding the need, as the user for requesting transportation of the product of the first shop 2 to the second shop 3.

For example, as the user for requesting transportation of the product of the first shop 2 to the second shop 3, the controller 15 may select a user who is estimated to pass near the second shop 3 after passing near the first shop 2, based on the destination after the user passes near the first shop 2 as estimated based on the schedule information.

For example, as the user for requesting transportation of the product of the first shop 2 to the second shop 3, the controller 15 may select a user who is estimated to pass near the second shop 3 after passing near the first shop 2, based on the route after the user passes near the first shop 2 as estimated based on the schedule information.

Based on the acquired schedule information for a plurality of users, the controller 15 may select a user who is least affected by transportation of the product as the user for requesting transportation of the product of the first shop 2 to the second shop 3. The controller 15 may, for example, select a user whose estimated route after passing near the first shop 2 passes closest to the second shop 3 as the user for requesting transportation of the product of the first shop 2 to the second shop 3.

The controller 15 transmits information requesting transportation of the product to the first terminal apparatus 20 of the user selected for requesting transportation of the product of the first shop 2 to the second shop 3.

The information requesting transportation of the product may include information such as information on the first shop 2, information on the second shop 3, the type of product, the quantity of product, the desired arrival time of the product at the second shop 3, and an incentive to be awarded to the user in a case in which the product is transported. The incentive may, for example, be a coupon usable at the second shop 3, or that the user can receive a portion of the transported products.

The controller 15 may transmit the information requesting transportation of the product to the first terminal apparatus 20 when a predetermined condition is met.

For example, the controller 15 may transmit the information requesting transportation of the product to the first terminal apparatus 20 when the user is staying at the first shop 2. In this way, by transmitting information to the first terminal apparatus 20 to request transportation of the product when the user is actually staying at the first shop 2, a user who actually stops by the first shop 2 can be requested to transport the product. This increases the likelihood that the user will accept to transport the product.

The communication interface 21 of the first terminal apparatus 20 receives the information, transmitted by the information processing apparatus 10, requesting transportation of the product. Via the communication interface 21, the controller 25 acquires the information, transmitted by the information processing apparatus 10, requesting transportation of the product. The controller 15 outputs, through the output interface 24, the information requesting transportation of the product. This enables the user to confirm the information requesting transportation of the product.

The user confirms the information included in the information requesting transportation of the product, such as the information on the first shop 2, the information on the second shop 3, the type of product, the quantity of the product, the desired arrival time of the product at the second shop 3, and the incentive to be awarded to the user in a case in which the product is transported. The user then decides whether to accept the request for transportation of the product.

In the case of accepting the request for transportation of the product, the user inputs information to the input interface 23 indicating acceptance of the request for transportation of the product. The controller 25 transmits the information indicating acceptance of the request for transportation of the product to the information processing apparatus 10 via the communication interface 21.

In a case in which the user does not accept the request for transportation of the product, the user enters information to the input interface 23 indicating non-acceptance of the request for transportation of the product. The controller 25 transmits the information indicating non-acceptance of the request for transportation of the product to the information processing apparatus 10 via the communication interface 21.

In a case in which the controller 15 of the information processing apparatus 10 acquires the information indicating non-acceptance of the request for transportation of the product, the controller 15 selects another user as the user for requesting transportation of the product of the first shop 2 to the second shop 3, and transmits information requesting transportation of the product to the first terminal apparatus 20 of the other user via the communication interface 11.

Operations of the information processing system 1 are described with reference to the flowchart in FIG. 5.

In step S101, the controller 15 of the information processing apparatus 10 acquires information regarding a need to transport a product of the first shop 2 to the second shop 3.

In step S102, the controller 15 acquires schedule information for at least one user who is staying near the first shop 2 or is scheduled to pass near the first shop 2.

In step S103, the controller 15 selects, based on the acquired schedule information, a user for requesting transportation of the product of the first shop 2 to the second shop 3.

In step S104, the controller 15 transmits information requesting transportation of the product to the first terminal apparatus 20 of the selected user.

As described above, in the information processing apparatus 10 according to the present embodiment, the controller 15 acquires schedule information, upon acquiring information regarding a need to transport a product of the first shop 2 to the second shop 3, for at least one user who is staying near the first shop 2 or is scheduled to pass near the first shop 2. Based on the acquired schedule information, the controller 15 selects a user for requesting transportation of the product from among the at least one user. The controller 15 transmits information requesting transportation of the product to the first terminal apparatus 20 of the user selected as the user for requesting transportation of the product. This enables an employee of the second shop 3 to request that the product be transported by an ordinary user other than a carrier. If the ordinary user is, for example, a traveler, the user can be requested to transport products over long distances. Also, by selection of the user for requesting transportation of the product based on the schedule information for at least one user, a user who will likely accept to transport the product can be requested to transport the product. Therefore, the information processing apparatus 10 according to the present embodiment can improve the convenience of requesting transportation of products by a party other than a carrier.

The present disclosure is not limited to the embodiment described above. For example, a plurality of blocks described in the block diagrams may be integrated, or a block may be divided. Instead of performing a plurality of steps described in the flowcharts in chronological order in accordance with the description, the plurality of steps may be performed in parallel or in a different order according to the processing capability of the apparatus that performs each step, or as required. Other modifications can be made without departing from the spirit of the present disclosure.

For example, some processing operations performed in the information processing apparatus 10 in the above embodiment may be performed in the first terminal apparatus 20 or the second terminal apparatus 30. Also, some of the processing operations performed in the first terminal apparatus 20 in the above embodiment may be performed in the information processing apparatus 10. Also, some of the processing operations performed in the second terminal apparatus 30 in the above embodiment may be performed in the information processing apparatus 10.

For example, a configuration that causes a general purpose electronic device such as a smartphone, a computer, or the like to function as the information processing apparatus 10 according to the above embodiment is possible. Specifically, a program in which processes for realizing the functions of the information processing apparatus 10 or the like according to the embodiment are written may be stored in a memory of the electronic device, and the program may be read and executed by a processor of the electronic device. Accordingly, in an embodiment, the present disclosure can also be implemented as a program executable by a processor.

For example, in the above embodiment, an example has been described in which the user loads products into the vehicle 4 to transport the products, but the user may transport the products by a transportation means other than the vehicle 4. For example, the user may use public transportation to transport products from the first shop 2 to the second shop 3. If the quantity of products is not large, the user can use public transportation to transport the products.

The invention claimed is:

1. An information processing apparatus, comprising:
a controller configured to:
acquire schedule information, upon acquiring information regarding a need to transport a product of a first shop to a second shop, for at least one user who is staying near the first shop;
select, based on the schedule information, a user for requesting transportation of the product from among the at least one user; and
transmit, to a terminal apparatus of the selected user, information requesting transportation of the product; and
a memory storing positional information of a plurality of terminal apparatuses of a plurality of users, the plurality of terminal apparatuses including the terminal apparatus of the selected user, and
wherein the controller is configured to:
extract the at least one user who is staying near the first shop based on the positional information stored in the memory, and
acquire the schedule information for the extracted at least one user.

2. The information processing apparatus of claim 1, wherein the controller is configured to select the user for requesting transportation of the product based on a schedule after passing near the first shop, the schedule being included in the schedule information.

3. The information processing apparatus of claim 1, wherein based on the schedule information, the controller is configured to estimate at least one of a time of passing near the first shop, a destination after passing near the first shop, or a route after passing near the first shop.

4. The information processing apparatus of claim 1, wherein the controller is configured to estimate a time at which the at least one user can arrive at the second shop based on the schedule information, and
select a user who is estimated to be able to arrive at a desired arrival time included in the information regarding the need as the user for requesting transportation of the product.

5. The information processing apparatus of claim 1, wherein based on the schedule information, the controller is configured to select a user who is least affected by transportation of the product as the user for requesting transportation of the product.

6. The information processing apparatus of claim 1, wherein the controller is configured to transmit an incentive to the terminal apparatus of the selected user.

7. The information processing apparatus of claim 6, wherein the incentive includes a coupon usable at the second shop.

8. A non-transitory computer readable medium storing positional information of a plurality of terminal apparatuses of a plurality of users and a program configured to cause a computer to perform operations comprising:
acquiring schedule information, upon acquiring information regarding a need to transport a product of a first shop to a second shop, for at least one user who is staying near the first shop;
selecting, based on the schedule information, a user for requesting transportation of the product from among the at least one user; and
transmitting, to a terminal apparatus of the selected user, information requesting transportation of the product,
wherein
the plurality of terminal apparatuses includes the terminal apparatus of the selected user, and
the program is configured to cause the computer to perform the operations further comprising:
extracting the at least one user who is staying near the first shop based on the positional information, and
acquiring the schedule information for the extracted at least one user.

9. The non-transitory computer readable medium of claim 8, wherein the program is configured to cause the computer to perform the operations further comprising:
selecting the user for requesting transportation of the product based on a schedule after passing near the first shop, the schedule being included in the schedule information.

10. The non-transitory computer readable medium of claim 8, wherein the program is configured to cause the computer to perform the operations further comprising:
estimating at least one of a time of passing near the first shop, a destination after passing near the first shop, or a route after passing near the first shop.

11. The non-transitory computer readable medium of claim 8, wherein the program is configured to cause the computer to perform the operations further comprising:
estimating a time at which the at least one user can arrive at the second shop based on the schedule information; and
selecting a user who is estimated to be able to arrive at a desired arrival time included in the information regarding the need as the user for requesting transportation of the product.

12. The non-transitory computer readable medium of claim 8, wherein the program is configured to cause the computer to perform the operations further comprising:

selecting, based on the schedule information, a user who is least affected by transportation of the product as the user for requesting transportation of the product.

13. The non-transitory computer readable medium of claim 8, wherein the program is configured to cause the computer to perform the operations further comprising:
transmitting an incentive to the terminal apparatus of the selected user.

14. The non-transitory computer readable medium of claim 13, wherein the incentive includes a coupon usable at the second shop.

15. An information processing method in an information processing apparatus, the information processing method comprising:
acquiring schedule information, upon acquiring information regarding a need to transport a product of a first shop to a second shop, for at least one user who is staying near the first shop;
selecting, based on the schedule information, a user for requesting transportation of the product from among the at least one user; and
transmitting, to a terminal apparatus of the selected user, information requesting transportation of the product,
wherein the information processing method further comprises:
storing, in a memory, positional information of a plurality of terminal apparatuses of a plurality of users, the plurality of terminal apparatuses including the terminal apparatus of the selected user;
extracting the at least one user who is staying near the first shop based on the positional information stored in the memory; and
acquiring the schedule information for the extracted at least one user.

16. The information processing method of claim 15, further comprising selecting the user for requesting transportation of the product based on a schedule after passing near the first shop, the schedule being included in the schedule information.

17. The information processing method of claim 15, further comprising estimating at least one of a time of passing near the first shop, a destination after passing near the first shop, or a route after passing near the first shop.

18. The information processing method of claim 15, further comprising:
estimating a time at which the at least one user can arrive at the second shop based on the schedule information; and
selecting a user who is estimated to be able to arrive at a desired arrival time included in the information regarding the need as the user for requesting transportation of the product.

19. The information processing method of claim 15, further comprising selecting, based on the schedule information, a user who is least affected by transportation of the product as the user for requesting transportation of the product.

20. The information processing method of claim 15, further comprising transmitting an incentive to the terminal apparatus of the selected user.

* * * * *